United States Patent [19]

Bortolini

[11] Patent Number: 5,347,227

[45] Date of Patent: Sep. 13, 1994

[54] CLOCK PHASE ADJUSTMENT BETWEEN DUPLICATED CLOCK CIRCUITS

[75] Inventor: James R. Bortolini, Boulder, Colo.

[73] Assignee: AT&T Bell Laboratories, Murray Hill, N.J.

[21] Appl. No.: 988,580

[22] Filed: Dec. 10, 1992

[51] Int. Cl.⁵ .................. H03K 7/00; H03K 17/00
[52] U.S. Cl. .................................. 328/63; 328/72; 328/155; 307/262
[58] Field of Search ............... 307/262, 269; 328/63, 328/72, 155, 55; 375/109; 377/107

[56] References Cited

U.S. PATENT DOCUMENTS

| | | | |
|---|---|---|---|
| 3,803,568 | 4/1974 | Higashide | 340/213 R |
| 4,156,200 | 5/1979 | Gomez | 328/61 |
| 4,494,211 | 1/1985 | Schwartz | 364/571 |
| 4,982,110 | 1/1991 | Yokogawa et al. | 307/269 |
| 5,022,050 | 6/1991 | Tanaka | 375/7 |
| 5,052,028 | 9/1991 | Zwack | 375/109 |
| 5,146,585 | 9/1992 | Smith, III | 307/269 |
| 5,150,068 | 9/1992 | Kawashima et al. | 307/269 |
| 5,239,562 | 8/1993 | Grimes | 375/109 |

Primary Examiner—Timothy P. Callahan
Assistant Examiner—Toan Tran
Attorney, Agent, or Firm—John C. Moran

[57] ABSTRACT

Cross coupling framing signals between two timing subsystems to adjust the phase relationship between the timing subsystems. In a standby timing system, framing signal of the standby timing system is used to start a counter, and framing signal of the active timing subsystem is used to stop the counter. The delay due to drivers, receivers and interconnecting cables is made to be an integer number of counts (nominal count) of the counter. Any difference between the contents of the counter and the nominal count represents the difference in phase between the standby timing subsystem and the active timing subsystem. The standby timing subsystem is adjusted to eliminate this phase difference by eliminating the difference between the nominal count and the contents of the counter.

7 Claims, 4 Drawing Sheets

CLOCK PHASE ADJUSTMENT BETWEEN DUPLICATED CLOCK CIRCUITS

TECHNICAL FIELD

This invention relates to clock systems, and, in particular, to adjusting the phase of clock signals generated by duplicated clock circuits.

BACKGROUND OF THE INVENTION

A prior art clock system such as those used in digital access cross-connect systems (DACS) is shown in FIG. 1 which illustrates clock circuits 120 and 121. One clock circuit is in an active mode whereas the other clock circuit is in a standby mode. Clock controllers 101 and 111 communicate via cable 110 and determine which clock circuit is active. If clock circuit 120 is active, then it drives clock buses 108 and 118 by the clock signals generated by phase locked loop 102. Clock controller 111 controls gates 115, 116, 117 so that the clock information on cable 109 is used to drive clock bus 118. Phase locked loop 112 utilizes the information received via cable 109 to align itself both in frequency and in phase with the output of phase locked loop 102.

In order to synchronize approximately the phases between clock buses 108 and 118, the output of phase locked loop 102 to bus 108 is delayed by delay line 104 to compensate for the nominal delay through gate 103, gate 117, and cable 109 to bus 118. When clock circuit 121 is active, similar functions are performed. However, there are problems with using a delay line to compensate for the delays through the semiconductor devices such as gates 103, 106, and 117. First, semiconductor devices have widely varying propagation delay times when the devices are not in the same physical package. Further, delay lines can not be temperature compensated for propagation delay shifts in the semiconductor devices, cables and within the delay line itself. Further, delay lines are notoriously unreliable devices.

The use of clock circuits such as clock circuits 120 and 121 has lead to severe limitations on duplicated digital switching systems. These limitations include having to place the clock circuits in very close proximity to each other and, in certain cases, within the same equipment shelf.

In addition, the use of such a clock system leads to the limitation on the architecture of the duplicated digital switching systems. This clock system normally allows error free switching between duplicated data signals only at relatively low speed interfaces which normally occur at the input and the output of the digital switching systems; but this clock system does not allow error free duplication switching in the high speed portions of the duplicated digital systems. This places a limitation on the switching architectures particularly in making digital switching systems more reliable. In addition, when the digital switching systems are switching high speed data at the inputs and the outputs, it is required to use high speed buffer memories at the input in order to compensate for the skew in clock signals from the duplicated clock circuits. The use of these high speed buffer memories at the inputs adds to the cost, power, and delay in such systems.

The U.S. Pat. application of G.J. Grimes, entitled "Matching the Clock Phase of Duplicated Clock Circuits", Ser. No. 07/788,077, filed on Nov. 5, 1991, assigned to the same assignee as the present application, discloses an apparatus for communicating clock signals from an active clock circuit to its local timing bus via a first path that is through a standby clock circuit, two transmission links interconnecting the clock circuits, and the active clock circuit. The active clock circuit communicates clock signals to the remote timing bus via a second path that is through the active clock circuit, a transmission link that is approximately twice as long as each of the other two transmission links, and the standby clock circuit. Commercially available transceivers are used in the first and second paths within the two clock circuits. To assure that delays due to propagation time variations of the transceivers remain the same for both paths, an equal number of transceivers in each clock circuit are used in each path. Further, to reduce propagation variations due to temperature change and doping levels, the transceivers in each path are on the same monolithic substrate of an intergrated circuit in each clock circuit. To reduce the delay variations within the transmission links due to temperature differences, the links are positioned physically close to each other so as to experience the same temperature. In case, it becomes necessary for the standby clock to become active, the standby clock circuit uses clock signals transmitted to the remote bus (which is local to the standby clock circuit) to adjust the phase of clock signals generated by the standby clock circuit to match the phase of clock signals generated by the active clock circuit.

The method for clock phase adjustment, as set forth in the above-referenced patent application, provides a high degree of clock phase adjustment. The clock phase between the two duplicated clock circuits can easily be adjusted to be within a few nanoseconds of each other. There is a limitation in the method set forth in the above-referenced patent application that is the need to loop the clock signals of each clock circuit through the other clock circuit which makes field maintenance difficult and presents certain reliability problems.

SUMMARY OF THE INVENTION

The foregoing problems are solved, and a technical advance is achieved in accordance with the principles of this invention incorporated in a method and apparatus that cross couple framing signals between two timing subsystems to adjust the phase relationship between the timing subsystems. A framing signal defines the start of a frame of data being switched through the switching network associated with the timing subsystem. In a standby timing system, the standby timing system's framing signal is used to start a counter, and the active timing subsystem's framing signal is used to stop the counter. The counter is clocked by an internal clock at a higher rate than the rate of the framing signals. Advantageously, the delay due to drivers, receivers and interconnecting cables is made to be an integer number of counts (nominal count) of the counter. The nominal count equals the delay in terms of clock cycles of the internal clock. Any difference between the contents of the counter and the nominal count represents the difference in phase between the standby timing subsystem and the active timing subsystem. The standby timing subsystem is adjusted to eliminate this phase difference by eliminating the difference between the nominal count and the contents of the counter.

DETAILED DESCRIPTION

Figure 1:
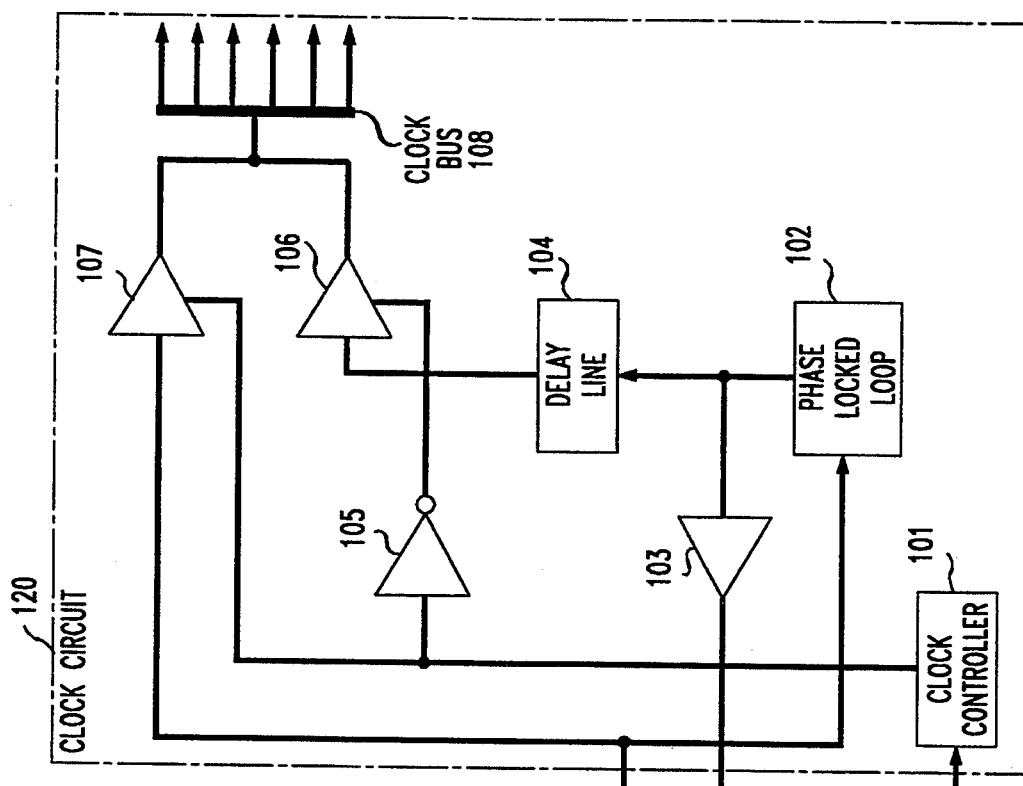
FIG. 1 illustrates, in block diagram form, a prior art system for clock phase adjustment between duplicated clock circuits.
Figure 1:
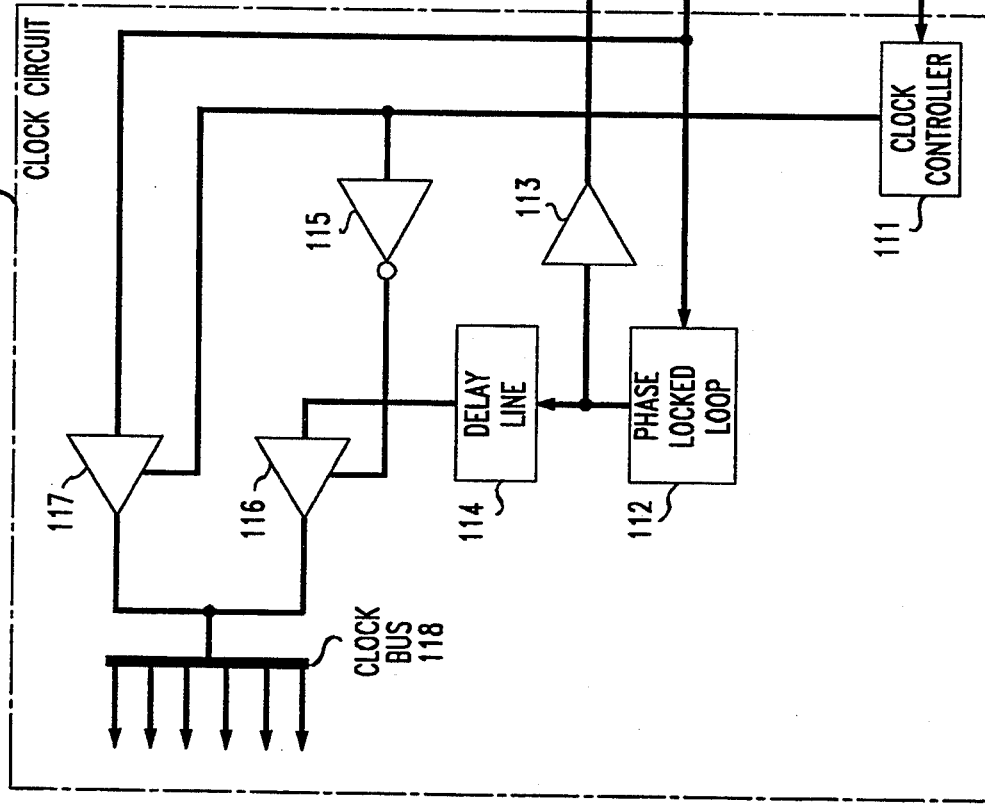
Figure 2:
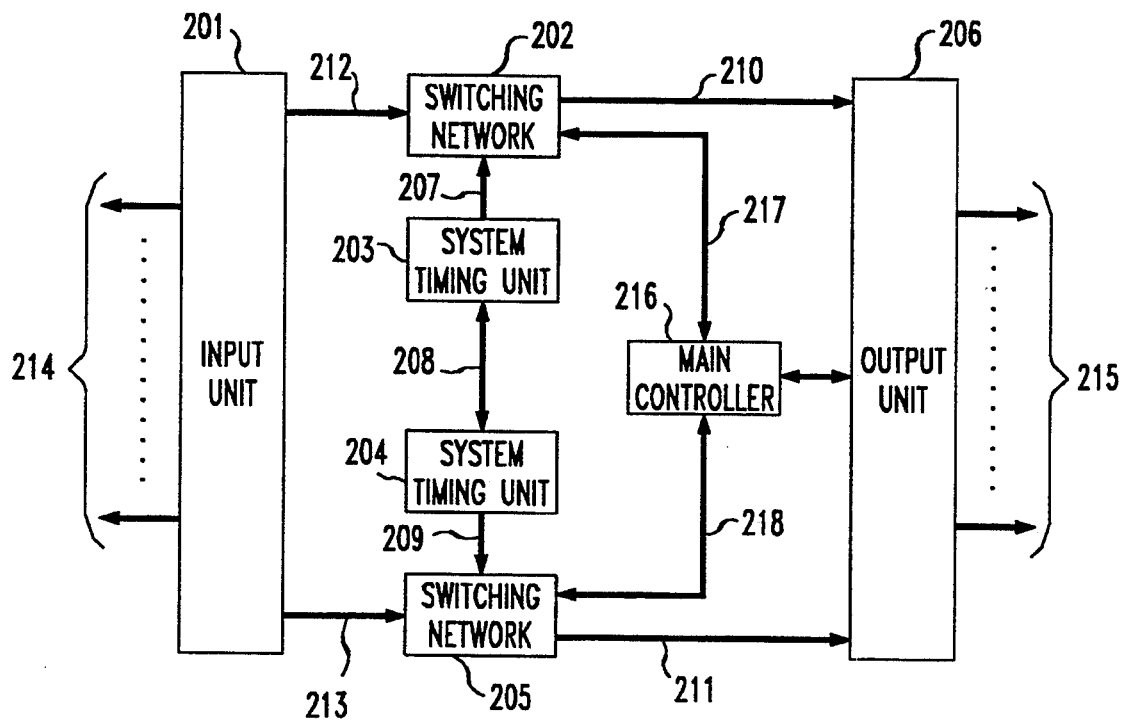
FIG. 2 illustrates, in block diagram form, a digital access cross-connect system.

FIG. 2 illustrates a digital access cross-connect system. The system has duplicated switching networks and system timing units (STU). Although not illustrated, input unit 201 and output unit 206 are also duplicated units. Input unit 201 is responsive to the input lines 214 to switch data from each of those lines through a duplicated path. One of the duplicated paths transmits data on cable 212 to switching network 202 and the other duplicated path transmits the data on cable 213 to switching network 205. Switching networks 202 and 205 are responsive to the input data to properly switch that data and to communicate the switched data to output unit 206 via cables 210 and 211, respectively. Output unit 206 utilizes only data from one of the switching networks. This switching network is commonly called the active switching network. Assume for sake of example, that switching network 202 is the active switching unit and that switching network 205 is the standby switching unit. System timing unit 203 provides all of the necessary timing to switching network 202 via cable 207. Similarly, system timing unit 204 provides all of the timing signals to switching network 205 via cable 209. Since switching network 202 is the active switching network, system timing unit 203 is the active system timing unit. As the standby system timing unit, system timing unit 204 maintains phase alignment with system timing unit 203 via information transmitted by system timing unit 203 via cable 208.

The phase alignment between system timing unit 203 and system timing unit 204 is important because main controller 216 can signal, via cable 217 and 218, the switching networks to exchange roles. When this occurs, switching network 202 becomes the standby switching network, and signal switching network 205 becomes the standby unit. During the time that the switching networks are changing roles, no data should be lost due to this change. Since the data rate of each line coming in on data lines 214 is 155,520 kHz the phase alignment is very crucial. The phase alignment is made more difficult since cable 208 may have a length of up to 100 meters. The remainder of this section is devoted to describing how phase alignment is maintained between system timing units 203 and 204.

As previously illustrated in FIG. 2, the timing complex for a digital access cross-connect system (DACS) utilizes two system timing units for the generation of the basic timing within the system. One of these system timing units is the active system timing unit and the other is the standby system timing unit. Very stringent specifications are imposed on frequency and phase which must be maintained between the active and the standby system timing units so that the switching unit of standby system timing unit can take over the DACS operation without loss of data due to any change in frequency or phase.

Figure 3:
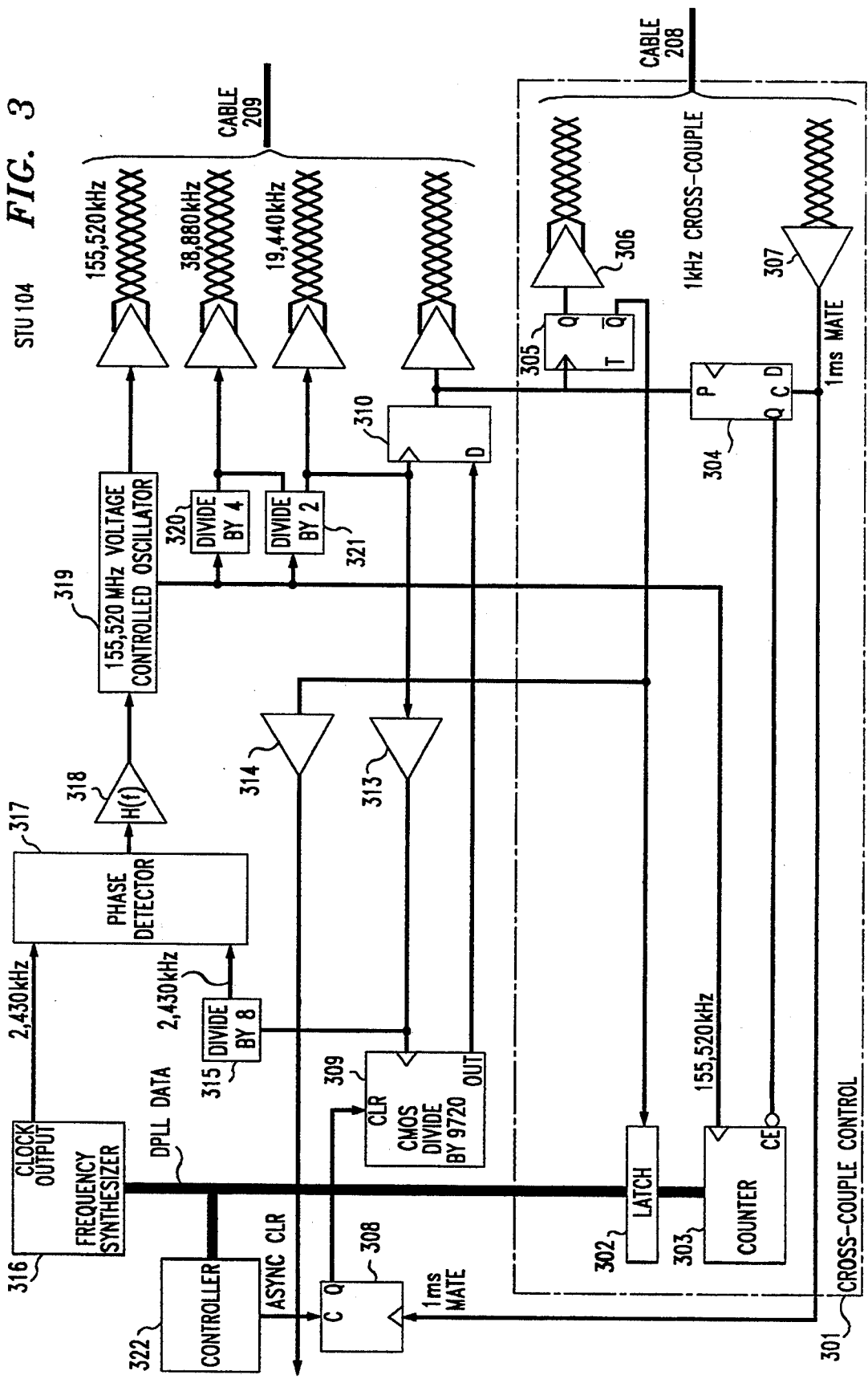
FIG. 3 illustrates, in block diagram form, a system timing unit.

Consider now the overall operation of an system timing unit. FIG. 3 illustrates standby system timing unit 204 in greater detail. System timing unit 203 is similar in design. Under control of controller 322, frequency synthesizer 316 generates the basic clock signals at 2430 kHz. This basic clock signal is then multiplied in frequency by voltage controlled oscillator 319 to have a frequency of 155,520 kHz. During the operation of synthesizer 316, certain distortions are caused in the phase. This distortion is removed by the close loop operations of elements 313, 315, 317, and 318. Counters 320 and 321 divide the output of oscillator 319 down to sub-multiples which are used by switching network 204 via cable 209.

Counter 309 is utilized to generate the multi-frame sync signal for the remainder of the system. The multi-frame sync signal occurs at a 2 kHz rate and is the lowest common clock signal in the system of FIG. 2. The multi-frame sync signal is generated through the operations of counter 309 and 310. Flip flop 308 is utilized to control the phase alignment during the initial startup of standby system timing unit 204.

Figure 4:
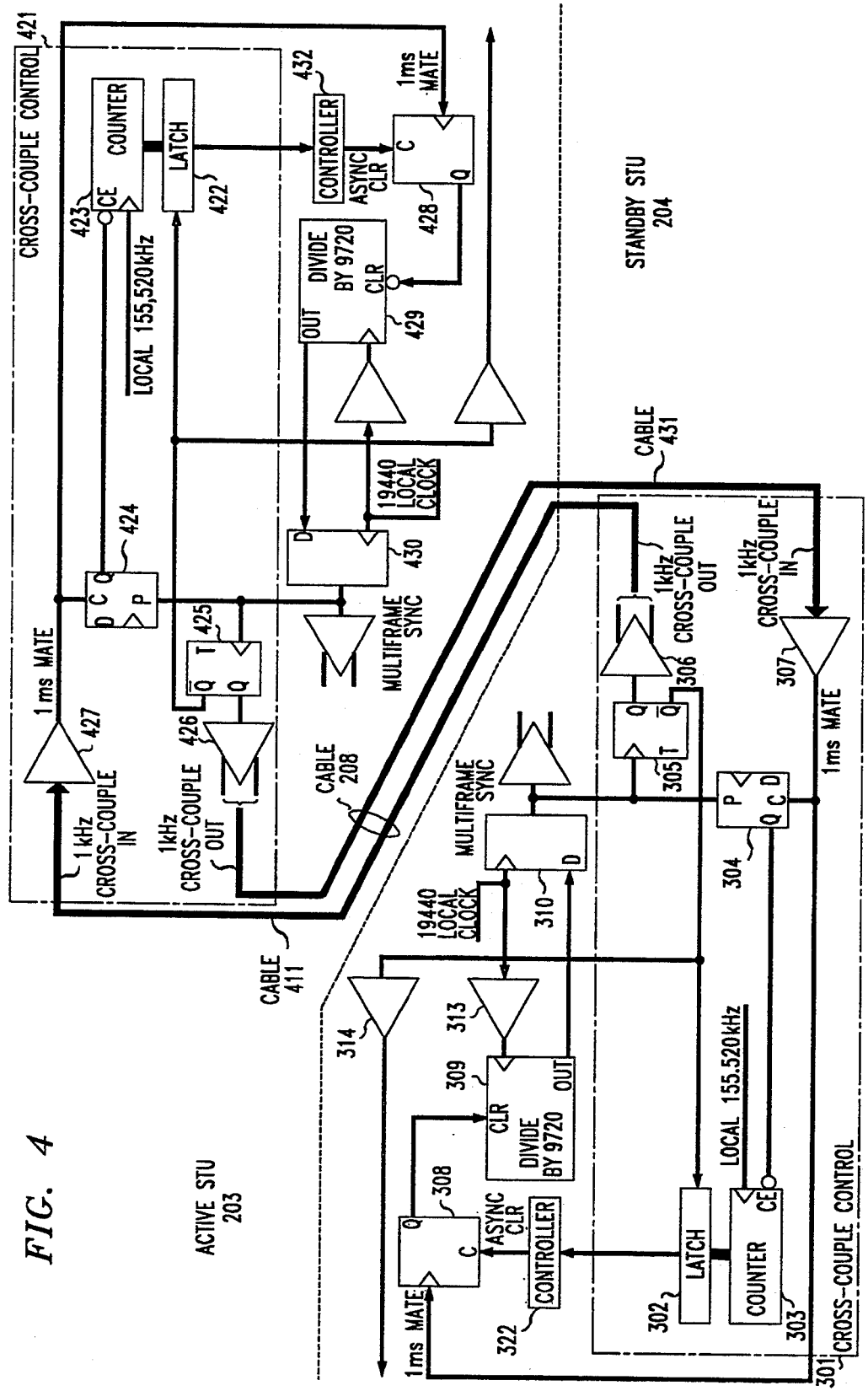
FIG. 4 illustrates, in block diagram form, portions of two system timing units interconnected in accordance with the invention.

Elements 302 through 307 comprise cross-couple control 301 whose operation is described in greater detail with respect to FIG. 4. Also, the operation of controller 322 is described in greater detail with respect to FIG. 4. Cross-couple control 301 determines the phase difference between the standby system timing unit and the active system timing unit in accordance with the invention.

FIG. 4 illustrates the relative portions of system timing units 203 and 204 with respect to phase adjustment of active system timing unit 203 and standby system timing unit 204. Both cross-couple control 301 and 421 generate a 1 kHz cross-couple signal (also referred to as the framing signal) which is transmitted to the other cross-couple control. For example, in standby system timing unit 204, flip flop 305 generates a 1 kHz signal and transmits this signal to active system timing unit 203 via driver 306 and cable 311. Similarly, flip flop 425 generates a 1 kHz signal and transmits it to standby system timing unit 204 via driver 426 and cable 431.

Consider how cross-couple control 301 of standby system timing unit 204 utilizes the 1 kHz signal received from cross-couple control 421 in active system timing unit 203 via cable 421. This cross-couple signal is utilized in cross-couple control 301 to control counter 303. When the rising edge of the cross-couple signal being transmitted to cross-couple control 421 by cross-couple control 301 is generated, counter 303 is enabled to start counting at a high frequency which advantageously is illustrated in FIG. 4 as 155,520 kHz. Counter 303 counts until the cross-coupled signal is received from cross-couple control 421 via cable 431. The contents of counter 303 are then loaded into latch 302 at the falling edge of the cross-couple signal being transmitted to cross-couple control 421. The signal used to clock latch 302 is from the $\overline{Q}$ output of flip flop 305 whose output goes high on the falling edge of the cross-couple signal. The contents of latch 302 can be read by controller 322. This count represents the physical delay through flip flop 425, driver 426, cable 431, and receiver 307 plus the difference in phase between active system timing unit 203 and standby system timing unit 204. Cable 411 and cable 431 each have a length such that the delay through the cable plus the delay through the flip flops, drivers, and receivers results in an integer count of counter 303. This integer count is henceforth referred to as the nominal count.

Any difference between this nominal count and the count read by controller 322 from latch 302 represents the difference in phase between active system timing unit 203 and standby system timing unit 204. Controller 322 is responsive to this difference to adjust the frequency synthesizer of standby system timing unit 204 to correct the phase difference between active system timing unit 203 and standby system timing unit 204.

In active system timing unit 203, controller 432 can determine whether or not the standby system timing unit 204 is in phase lock with active system timing unit 203 by reading latch 422. If the contents of latch 422 are equal to the nominal value plus or minus one then standby system timing unit 204 is in phase alignment with active system timing unit 203. This is true since cables 411 and 431 are equal in length and elements 425 through 427 are identical to elements 305 through 307. In addition, counter 423 is clocked at the same clock rate as counter 303.

When standby system timing unit 204 first becomes active after being powered down (commonly referred to as a cold start), there is no correlation in phase between active system timing unit 203 and standby system timing unit 204. This can be readily be determined by controller 322 reading the contents of latch 302. If the contents are significantly higher or lower than the nominal value, then standby system timing unit 204 is out of phase alignment with active system timing unit 203 by a large mount. To overcome this large difference, controller 322 utilizes a fast-lock procedure. As part of the fast-lock procedure, controller 322 transmits an ASYNC CLR signal to flip flop 308. In response to that signal, flip flop 308 allows the cross-couple signal being transmitted via cable 431 by active system timing unit 203 to clear counter 309. A similar operation is performed with respect to counter 429 in active system timing unit 203. Once coarse phase alignment has been achieved, controller 322 removes the ASYNC CLR signal and utilizes the previously described method to adjust for finer phase alignment between standby system timing unit 204 and active system timing unit 203.

Figure 5:
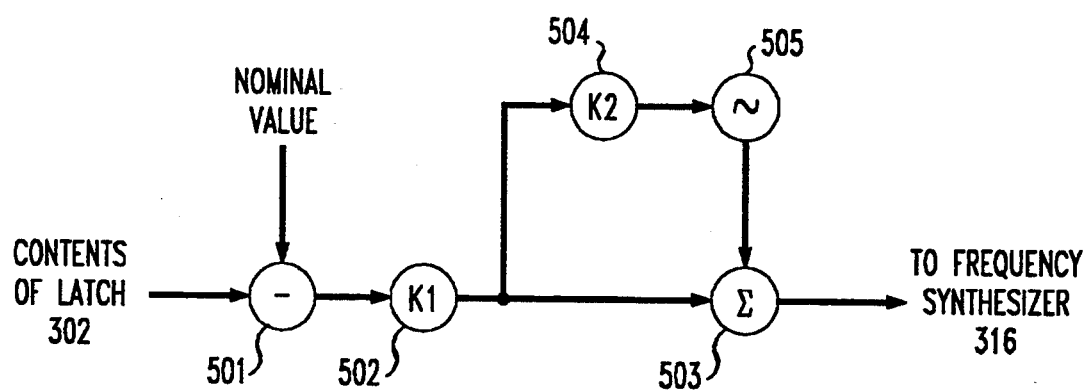
FIG. 5 illustrates, in standard control system symbolic form, the phase adjustment performed in response to a phase difference.

FIG. 5 illustrates with standard control system symbols the operations performed by controller 322 in response to the contents of latch 302 to adjust frequency synthesizer 316 so that system timing unit 300 comes closer in phase alignment with the active system timing unit. Element 501 subtracts the nominal value from the actual contents of latch 302. Element 502 multiplies the resulting difference by a constant, K1, the output of element 502 is then transmitted to elements 503 and 504. Element 504 multiplies the output of element 502 by a second constant, K2, and transfers the result to integrator 505. Integrator 505 performs an integration on a large number of values from element 502. The output of integrator 505 is then combined by summer 503 with the output of element 502. The result is the value that is sent to frequency synthesizer 316 to adjust that synthesizer.

Summer 503 is combining the weighted present difference with the intergration of differences from integrator 505. Note, although FIG. 5 is illustrated using standard control system symbols, the operations are performed digitally by controller 322 using well known techniques in the art.

Utilizing the present frequency signal utilized to drive counter 303, the resolution in the adjustment of the phase between standby system timing unit 204 and active system timing unit 203 is plus or minus one nanoseconds. However, by increasing the frequency of the signal driving counter 403, this accuracy could be increased proportionally. In addition, this higher frequency would allow a controller having the resulting count of counters 303 and 423 to determine the delay through cable 411, cable 431, element 305 through 307 and elements 425 through 427. Determining the delay in this manner would allow for automatic adjustment for different cable lengths. Finally, the phase alignment would be greatly improved allowing the system timing units to meet even more stringent phase alignment requirements.

The delay is determined in the following manner. When standby system timing unit 204 starts executing from a cold start, it assumes a predetermined nominal count for counter 303 of FIG. 4 and enters phase lock based on this nominal count. After a predetermined amount of time has elapsed, controller 432 reads the count of latch 422, which contains the count from counter 423, and transmits this count to controller 322 via cable 217, main controller 216, and cable 218. Controller 322 is responsive to the count from latch 422 to add that count to the count from latch 302. Controller 322 then divides that sum by two and uses the result as the new nominal count for counter 303. This process is repeated until the counts in latches 302 and 422 differ by only some predetermined difference.

It is to be understood that the above-described embodiments are merely illustrative of principles of the invention and that other arrangements may be devised by those skilled in the art without departing from the spirit or scope of the invention.

I claim:

1. An apparatus for adjusting phase of first timing signals generated by a first clock circuit, comprising:

a counter counting at a fixed rate in response to being started by an internal signal repetitively generated by the first clock circuit after generation of a first predetermined number of first timing signals by the first clock circuit;

means in a second clock circuit for repetitively generating an external signal after generation of a second predetermined number of second timing signals by the second clock circuit where the first and second predetermined numbers are equal;

means for transmitting the external signal to the first clock circuit and the transmitting means being adjusted to cause a delay resulting in an integer count of the counter;

the counter responsive to receipt of the external signal by the first clock circuit to stop counting;

a latch responsive to a falling edge of the internal signal for storing the contents of the counter; and means responsive to a difference between the contents of the latch and the integer count due to the delay of the transmission means for modifying the phase of the first timing signals upon the latch storing the contents of the counter.

2. An apparatus for adjusting phase of the first timing signals generated by a first timing unit to match phase of second timing signals generated by a second timing unit, comprising:

means in the first timing unit for repetitively generating a first signal after a first predetermined number of first timing signals of the first timing unit;

means in the second timing unit for repetitively generating a second signal after a second predetermined number of second timing signals of the second timing unit where the first and second predetermined numbers are equal;

means in the first timing unit for counting at a fixed rate in response to the first signal;

means for transmitting the second signal to the counter and the transmitting means being adjusted to cause a delay resulting in an integer count of the counting means;

the counting means further responsive to the second signal to stop counting; and means in the first timing unit for modifying the phase of the first timing unit in response to the contents of the counting means and the integer count due to the delay of the transmission means for adjusting the phase of the first timing unit upon the counting means stopping.

3. The apparatus of claim 2 wherein the counting means comprises a counter responsive to the first signal to start counting and to the second signal to stop counting; and a latch responsive to a falling edge of the first signal for storing the contents of the counter whereby the contents of the latch are used by the modifying means.

4. A method for adjusting phase of first timing signals generated by a first clock circuit, the method comprising the steps of:

counting at a fixed rate in response to being started by an internal signal repetitively generated by the first clock circuit after generation of a first predetermined number of first timing signals by the first clock circuit;

repetitively generating by a second clock circuit an external signal after generation of a second predetermined number of second timing signals by the second clock circuit where the first and second predetermined numbers are equal;

transmitting the external signal to the counter and the transmitting step being adjusted to cause a delay resulting in an integer count of the counting step;

the counting step further responsive to receipt of the external signal by the first clock circuit to stop counting; and modifying the phase of the first timing signals of the first clock circuit in response to the number generated by the step of counting and the integer count due to the delay of the transmission step for adjusting the phase of the clock circuit upon the counting being stopped.

5. The method of claim 4 wherein the first clock circuit comprises a counter and latch and the step of counting comprises the steps of starting to count by the counter in response to the internal signal and stopping by the counter to count in response to the external internal signal; and storing by the latch in response to a falling edge of the internal signal the contents of the counter whereby the contents of the latch are used by the modifying step.

6. A method for adjusting phase of first timing signals generated by a first timing unit to match phase of second timing signals generated by a second timing unit, the method comprising the steps of:

repetitively generating by the first timing unit a first signal after a first predetermined number of first timing signals of the first timing unit;

repetitively generating by the second timing unit a second signal after a second predetermined number of second timing signals of the second timing unit where the first and second predetermined numbers are equal;

counting by the first timing unit at a fixed rate in response to being started by the first signal;

transmitting the second signal to the counter and the transmitting step being adjusted to cause a delay resulting in an integer count of the counting step;

the counting step further in response to the second signal stops counting; and modifying by the first timing unit the phase of the first timing unit in response to results of the counting step and the integer count due to the delay of the transmission step for adjusting the phase of the first timing unit upon the counting step stopping.

7. The method of claim 6 wherein the first timing unit comprises a counter and a latch and the step of counting comprises the steps of starting to count by the counter in response to the first signal and stopping by the counter counting in response to the second signal; and storing by the latch in response to a falling edge the first signal the contents of the counter whereby the contents of the latch are used by the modifying step.

* * * * *